US012619288B2

(12) United States Patent
Jung et al.

(10) Patent No.: US 12,619,288 B2
(45) Date of Patent: May 5, 2026

(54) ELECTRONIC DEVICE COMPRISING ANTENNA

(71) Applicant: SAMSUNG ELECTRONICS CO., LTD., Suwon-si (KR)

(72) Inventors: Duhoon Jung, Suwon-si (KR); Dongil Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 382 days.

(21) Appl. No.: 18/205,295

(22) Filed: Jun. 2, 2023

(65) Prior Publication Data

US 2023/0315159 A1      Oct. 5, 2023

Related U.S. Application Data

(63) Continuation of application No. PCT/KR2021/018174, filed on Dec. 3, 2021.

(30) Foreign Application Priority Data

Dec. 4, 2020   (KR) ......................... 10-2020-0168451
Apr. 5, 2021   (KR) ......................... 10-2021-0043851

(51) Int. Cl.
  *G06F 1/16*       (2006.01)
  *G06T 19/00*      (2011.01)
(52) U.S. Cl.
  CPC .......... *G06F 1/1677* (2013.01); *G06F 1/1652* (2013.01); *G06F 1/1686* (2013.01); *G06F 1/1698* (2013.01); *G06T 19/006* (2013.01)
(58) Field of Classification Search
  CPC .... G06F 1/1624; G06F 1/1652; G06F 1/1677; G06F 1/1686; G06F 1/1694;
(Continued)

(56) References Cited

U.S. PATENT DOCUMENTS

2011/0217932 A1    9/2011  Hsieh
2017/0115941 A1*   4/2017  Kim ...................... G06F 3/0488
(Continued)

FOREIGN PATENT DOCUMENTS

CN          111478988 A      7/2020
KR    10-2014-0028116 A      3/2014
(Continued)

OTHER PUBLICATIONS

European Extended Search Report issued Apr. 5, 2024 by the European Patent Office for EP Patent Application No. 21901054.3.
(Continued)

*Primary Examiner* — Nelson M Rosario
(74) *Attorney, Agent, or Firm* — Sughrue Mion, PLLC

(57) ABSTRACT

An electronic device includes: a first housing; a second housing, wherein at least one of the first and the second housing is moveably relative to the other one of the first and the second housing; a display including an expandable or retractable screen, wherein a size of a part of the screen visually exposed to an outside changes as one of the housing is moved; an antenna in an area of the first housing; a camera in an area of the second housing; at least one processor configured to execute the instructions stored in memory to: obtain information on a first position between the antenna and an anchor; obtain information on a position change between the antenna and the camera; and estimate information on a second position between the camera and the anchor based on the information on the first position and the information on the position change.

15 Claims, 12 Drawing Sheets

(58) Field of Classification Search
CPC ...... G06F 1/1698; G06F 3/011; G06F 3/0481;
G06T 19/006; G09F 9/301; G09G 3/035
See application file for complete search history.

(56) References Cited

U.S. PATENT DOCUMENTS

| | | | |
|---|---|---|---|
| 2018/0076875 A1* | 3/2018 | Haverinen | ................ G01S 3/48 |
| 2018/0364827 A1 | 12/2018 | Chung | |
| 2020/0021011 A1 | 1/2020 | Cooper et al. | |

FOREIGN PATENT DOCUMENTS

| | | |
|---|---|---|
| KR | 10-1453909 B1 | 10/2014 |
| KR | 10-1704513 B1 | 2/2017 |
| KR | 10-2017-0024942 A | 3/2017 |
| KR | 10-2017-0082016 A | 7/2017 |
| KR | 10-1902715 B1 | 9/2018 |
| KR | 10-2019-0050944 A | 5/2019 |
| KR | 10 2019 01 43029 A | 12/2019 |

OTHER PUBLICATIONS

International Search Report (PCT/ISA/210) issued Mar. 4, 2022 by the International Searching Authority in counterpart International Patent application No. PCT/KR2021/018174.
Written Opinion (PCT/ISA/237) issued Mar. 4, 2022 by the International Searching Authority in counterpart International Patent application No. PCT/KR2021/018174.

* cited by examiner 600-1

630

620

610

600-2

630          640

620          650

ELECTRONIC DEVICE COMPRISING ANTENNA

CROSS-REFERENCE TO RELATED APPLICATIONS

This application is a by-pass continuation application of International Application No. PCT/KR2021/018174, filed on Dec. 3, 2021, which claims priority to Korean Patent Application No. 10-2020-0168451, filed on Dec. 4, 2020, and Korean Patent Application No. 10-2021-0043851, filed on Apr. 5, 2021, in the Korean Intellectual Property Office, the disclosures of which are incorporated by reference herein in their entireties.

BACKGROUND

1. Field

The disclosure relates to an electronic device comprising an antenna device.

2. Description of Related Art

With the development of display-related technologies, flexible display devices are being researched and developed at a use stage, such as being folded, rolled into a roll shape, or stretchable in at least one direction. Since these displays may be deformed into various shapes, they may satisfy both a demand for a larger display in the use stage and a demand for a smaller display for portability.

Furthermore, research and product development on services providing augmented reality (AR) have been actively conducted. In particular, AR is being used more actively as devices including a photographing means, a high-performance computing means, and a communication means, such as a smartphone, is developed. An AR service may be a variety of services that may maximize user convenience by displaying various side information on an image captured through a photographing means or the like.

In order to provide augmented reality (AR), it is necessary to be able to estimate, in real time, coordinate values of a position and a posture of an anchor at a camera's viewpoint that changes according to the movement of a user in a three-dimensional (3D) space. However, in a flexible display device, as the size of a display screen changes, coordinate values of the position and posture of the anchor at the camera's viewpoint may change, and as a result, AR content may be displayed at an incorrect position.

SUMMARY

Provided is an electronic device in which coordinate values of a position and posture of an anchor at a camera's viewpoint are estimated in real time to determine a position where AR content is to be displayed according to a size of a display screen.

According to an aspect of the disclosure, an electronic device includes: a first housing; a second housing, wherein at least one of the first housing and the second housing is configured to be movable relative to the other one of the first housing and the second housing; a display including a screen which is expandable or retractable, wherein a size of a part of the screen visually exposed to an outside changes as at least one of the first housing and the second housing is moved; an antenna disposed in a partial area of the first housing; a camera disposed in a partial area of the second housing; a memory storing instructions; and at least one processor configured to execute the instructions to: obtain information on a first position between the antenna and an anchor; obtain information on a position change between the antenna and the camera; and estimate information on a second position between the camera and the anchor based on the information on the first position and the information on the position change.

The memory may include: a plurality of lookup tables storing phase offset values corresponding to distance information between the antenna and the anchor, and information on a distance change between the antenna and the camera, and the at least one processor may be further configured to execute the instructions to determine a phase offset value from the plurality of lookup tables based on the information on the first position and the information on the position change.

The at least one processor may be further configured to execute the instructions to: determine a target lookup table corresponding to the information on the first position from among the plurality of lookup tables; and determine the phase offset value from the target lookup table based on the information on the position change.

The electronic device may further include a sensor configured to detect the size of the part of the screen visually exposed to the outside.

The memory may be configured to store information on an initial position between the antenna and the camera in a state in which the second housing does not move, and the at least one processor may be further configured to execute the instructions to obtain the information on the position change based on the information on the initial position and the size of the part of the screen visually exposed to the outside.

The at least one processor may be further configured to execute the instructions to obtain the information on a distance change between the antenna and the camera based on the information on the initial position and the size of the part of the screen visually exposed to the outside.

The at least one processor may be further configured to execute the instructions to obtain information on a phase change between the antenna and the camera based on the information on the initial position and the size of the part of the screen visually exposed to the outside.

The antenna may be configured to collect position information data for obtaining the information on the first position by communicating with an antenna mounted on the anchor, and the at least one processor may be further configured to execute the instructions to obtain distance information and phase information between the antenna and the anchor based on the position information data.

The antenna may include: n ultra-wideband (UWB) antenna, and the at least one processor may be further configured to execute the instructions to obtain the phase information between the antenna and the anchor based on a phase difference of a signal received from a plurality of patch antennas included in the UWB antenna to the antenna mounted on the anchor.

The at least one processor may be further configured to execute the instructions to obtain direction information between the camera and the anchor based on the distance information and the phase information between the antenna and the anchor, and distance information between the antenna and the camera.

The at least one processor may be further configured to execute the instructions to obtain distance information between the camera and the anchor based on the distance information and the phase information between the antenna and the anchor, and the distance information between the antenna and the camera.

The electronic device may further include an inertial measurement unit (IMU) sensor for measuring direction information on a direction the electronic device is facing and tilt information of the electronic device, and the at least one processor may be further configured to execute the instructions to receive additional information determined based on the information on the second position, the direction information, and the tilt information, and render augmented reality content based on the additional information.

According to an aspect of the disclosure, a method of providing augmented reality content by an electronic device including a display including a screen that is expandable or retractable, the method including: detecting a change in a size of the screen that is visually exposed to an outside; obtaining information on a first position between an antenna of the electronic device and an anchor; based on the change in the size of the screen, obtaining information on a position change between the antenna and a camera of the electronic device; estimating information on a second position between the camera and the anchor based on the information on the first position and the information on the position change; obtaining direction information and tilt information of the electronic device; receiving additional information determined based on the information on the second position and the direction information and the tilt information of the electronic device; and rendering the augmented reality content based on the additional information, wherein a position of the camera changes as the size of the screen changes.

The estimating of the information on the second position may include: determining a phase offset value from a plurality of lookup tables based on the information on the first position and the information on the position change; and estimating the information on the second position by compensating the phase offset value for the information on the first position, and the plurality of lookup tables may store phase offset values corresponding to distance information between the antenna and the anchor and information on a distance change between the antenna and the camera.

The determining of the phase offset value may include: determining a target lookup table corresponding to the information on the first position from among the plurality of lookup tables; and determining the phase offset value from the target lookup table based on the information on the position change, and the estimating of the information on the second position may include obtaining at least one of direction information and distance information between the camera and the anchor, based on the distance information and phase information between the antenna and the anchor, and distance information between the antenna and the camera.

According to one or more embodiments, coordinate values of a position and posture of an anchor at a camera's viewpoint may be estimated in real time to determine a position where AR content is to be displayed according to a size of a display screen in a flexible display device.

In addition, various effects directly or indirectly ascertained through the disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
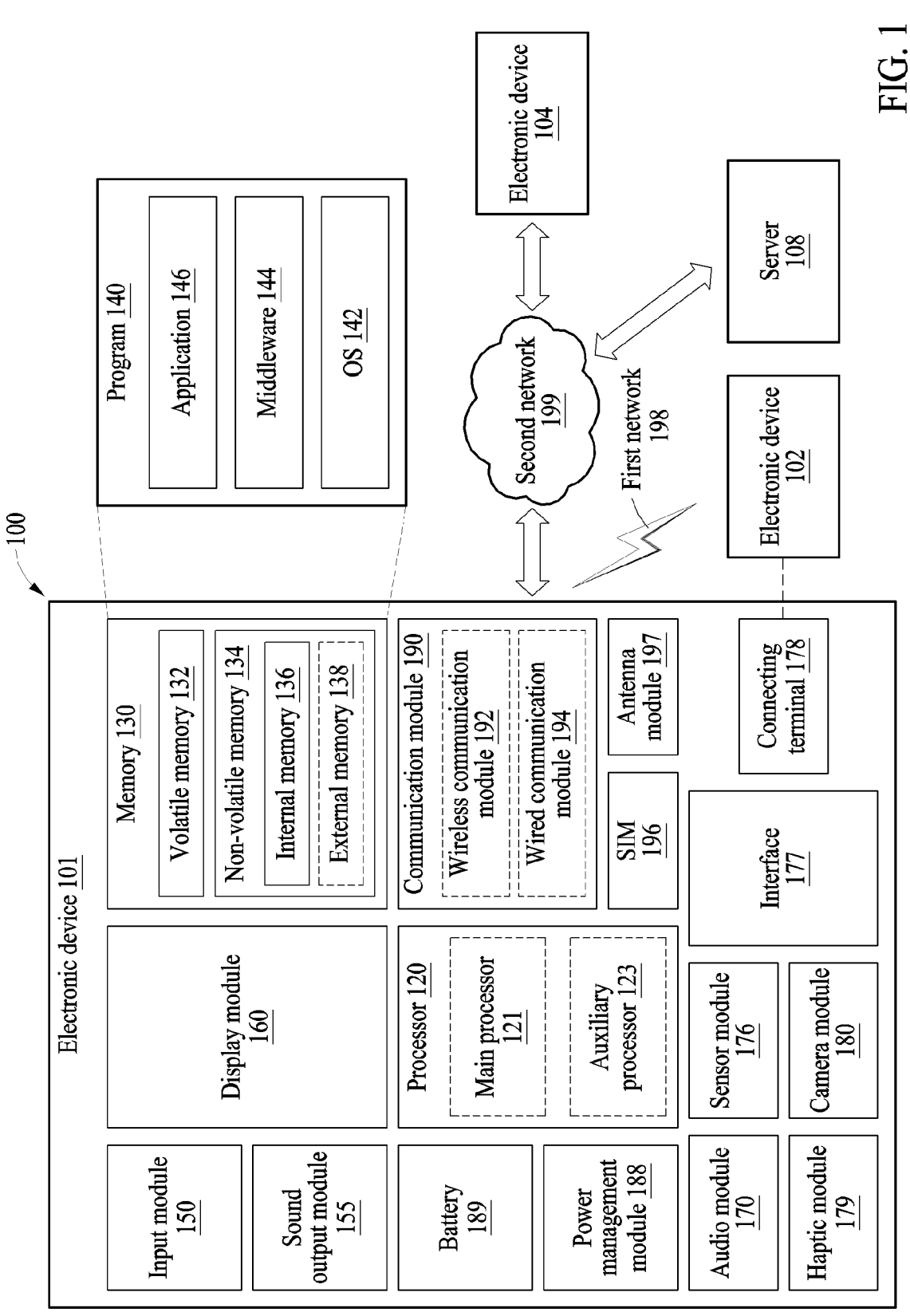
FIG. 1 is a block diagram illustrating an electronic device in a network environment, according to one or more embodiments.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100, according to one or more embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module or display 160, an audio module 170, a sensor module or sensor 176, an interface 177, a connecting terminal 178, a haptic module 179, a camera module or camera 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented as separate from, or as part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., an NPU) may include a hardware structure specified for artificial intelligence model processing. An artificial intelligence model may be generated through machine learning. Such learning may be performed, for example, by the electronic device 101, in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The artificial intelligence model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a record. The receiver may be used to receive an incoming call. According to an embodiment, the receiver may be implemented as separate from, or as part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, hologram device, and projector. According to an embodiment, the display module 160 may include a touch sensor adapted to sense a touch, or a pressure sensor adapted to measure an intensity of a force incurred by the touch. According to an embodiment, the display module 160 may include a screen of which the size visually exposed to the outside of the display module 160 changes. For example, the display module 160 may be an expandable display, such as a foldable display, a rollable display, and a slideable display. For example, the expandable display may be implemented through a flexible display.

The audio module 170 may convert a sound into an electrical signal and vice versa. According to an embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via their tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, for example, new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, for example, a high data transmission rate. The wireless communication module 192 may support various technologies for securing performance on a high-frequency band, such as, for example, beamforming, massive multiple-input and multiple-output (massive MIMO), full dimensional MIMO (FD-MIMO), an array antenna, analog beam-forming, or a large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to one or more embodiments, the antenna module 197 may form a mmWave antenna module. According to an embodiment, the mmWave antenna module may include a PCB, an RFIC disposed on a first surface (e.g., the bottom surface) of the PCB or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed at the electronic device 101 may be executed at one or more external electronic devices (e.g., the external electronic devices 102 and 104, or the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In an embodiment, the external electronic device (e.g., the electronic device 104) may include an Internet-of-Things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

In an embodiment, the electronic device 101 may be movable and may perform wireless data communication with the external electronic device 102 or 104 in order to obtain position information of the external electronic device 102 or 104 installed (or fixed) adjacent to a predetermined structure. In an embodiment, the electronic device 101 may periodically receive data in a designated format related to a designated communication method from the external electronic device 102 or 104 or periodically verify whether a signal in a designated format is received. For example, the designated communication method may correspond to an ultra-wideband (UWB) communication method.

The electronic device 101 according to an embodiment may function as a tag for UWB communication. The electronic device 101 may correspond to a device for determining position information of the external electronic device 102 or 104 based on a signal (e.g., a signal related to UWB communication) of a designated format received from the external electronic device 102 or 104 connected to the electronic device 101.

According to an embodiment, the external electronic device 102 or 104 may function as an anchor for UWB communication. The external electronic device 102 or 104 may correspond to a device for transmitting a signal (e.g., a signal related to UWB communication) designated to the electronic device 101 so that the electronic device 101 may determine position information of the external electronic device 102 or 104. Hereinafter, the external electronic device 102 or 104 may be referred to as an anchor.

Figure 2:
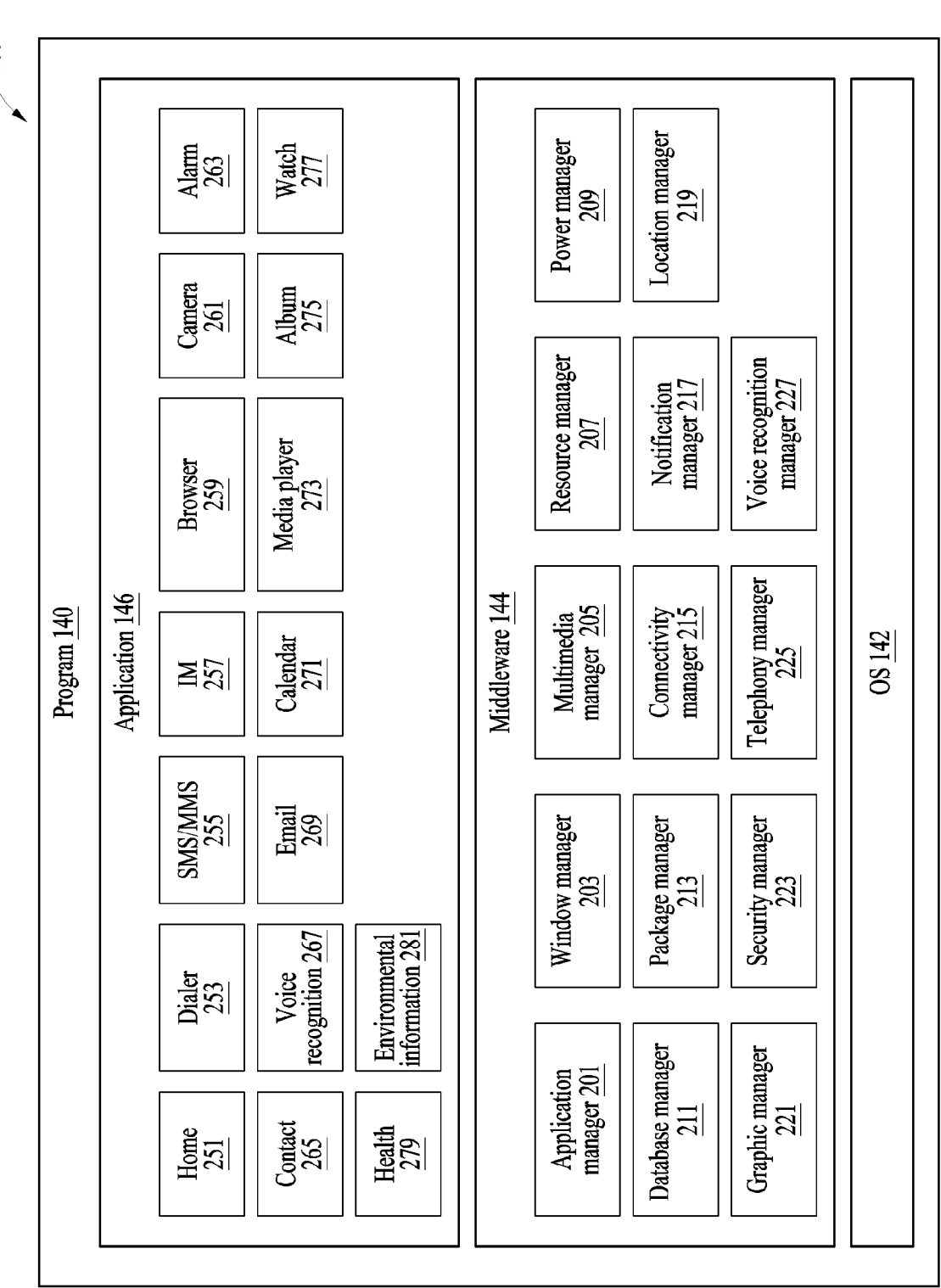
FIG. 2 is a block diagram illustrating a program, according to one or more embodiments.

FIG. 2 is a block diagram 200 illustrating a program 140, according to one or more embodiments. According to an embodiment, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be preloaded on the electronic device 101 during manufacturing or may be downloaded from or updated by an external electronic device (e.g., the electronic device 102 or 104, or the server 108) during use by a user.

The OS 142 may control the management (e.g., allocation or deallocation) of one or more system resources (e.g., a process, a memory, or a power source) of the electronic device 101. The OS 142 may additionally or alternatively include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an embodiment, the power manager 209 may interwork with a basic input/output system (BIOS) of the electronic device 101.

The database manager 211, for example, may generate, search, or change a database to be used by the application 146. The package manager 213, for example, may manage the installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage position information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit the user's voice data to the server 108, and may receive, from the server 108, a command corresponding to a function to be executed on the electronic device 101 based on at least in part on the voice data, or text data converted based on at least in part on the voice data. According to an embodiment, the middleware 244 may dynamically delete some existing components or add new components. According to an embodiment, at least part of the middleware 144 may be included as a part of the OS 142 or implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), environmental information 281 (e.g., for measuring air pressure, humidity, or temperature information), or augmented reality applications. According to an embodiment, the application 146 may further include an information exchange application that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101 or a portion of components thereof (e.g., a display module or a camera module of the external electronic device). The device management application may additionally or alternatively support the installation, deletion, or update of an application that operates in an external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be appreciated that various embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, each of such phrases as "A or B", "at least one of A and B", "at least one of A or B", "A, B or C", "at least one of A, B and C", and "at least one of A, B, or C", may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101 of FIG. 1). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments disclosed herein may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 3:
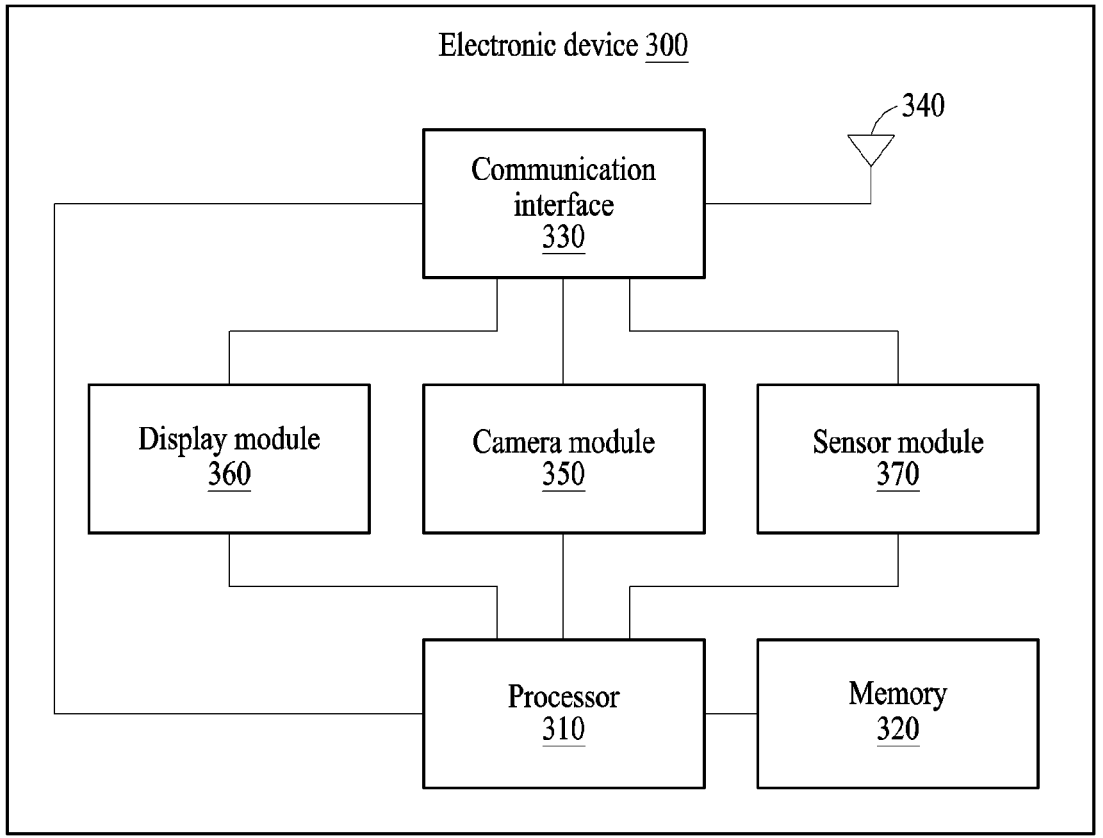
FIG. 3 is a block diagram of an electronic device, according to one or more embodiments.

FIG. 3 is a block diagram of an electronic device, according to various embodiments.

Referring to FIG. 3, an electronic device 300 may include a processor 310, a memory 320, a communication interface 330, an antenna module 340, a camera module 350, and a display module 360. The electronic device 300 according to an embodiment may correspond to the electronic device 101 disclosed in FIG. 1, and for clarity of description, a repeated description related thereto may be simplified or omitted.

In an embodiment, the processor 310 may control the overall operations of the electronic device 300 to perform various embodiments of the disclosure. For example, the processor 310 may correspond to the processor 120 disclosed in FIG. 1. The processor 310 may control at least one hardware module included in the electronic device 300 to perform at least one operation in a designated order. For example, the processor 310 may calculate position information between the antenna module 340 and an external electronic device (e.g., the external electronic device 102 or 104 of FIG. 1) (hereinafter, may be referred to as an anchor) and position change information between the antenna module 340 and the camera module 350, and estimate position information between the camera module 350 and the anchor. A more detailed operation of the processor 310 will be further described with reference to the drawings below.

In an embodiment, as shown in FIG. 3, the processor 310 may be electrically connected to the communication interface 330. For example, the processor 310 may be a main processor (e.g., an application processor).

In an embodiment, some operations for performing various embodiments of the disclosure may be performed by another processor included in the communication interface 330 instead of the processor 310. For example, the communication interface 330 may include an auxiliary processor (e.g., a communication processor), and a sequence number counting operation may be performed by the auxiliary processor included in the communication interface 330.

In an embodiment, the memory 320 may correspond to the memory 130 disclosed in FIG. 1. In an embodiment, the memory 320 may store an instruction (or a set of instructions, or an application) for performing various embodiments. For example, the memory 320 may store an instruction that allows the processor 310 or a processor included in the communication interface 330 to count a sequence number corresponding to a superframe included in a designated time period during execution.

In an embodiment, the memory 320 may store a plurality of lookup tables displaying phase offset values corresponding to distance information between the antenna module 340 and the anchor and distance change information between the antenna module 340 and the camera module 350.

In an embodiment, the plurality of lookup tables may include at least one 3 dimension lookup table. For example, the memory 320 may store at least one three-dimensional (3D) lookup table displaying the phase offset values using a 3D array expressed based on distance information between the antenna module 340 and the anchor and distance change information between the antenna module 340 and the camera module 350.

In an embodiment, the memory 320 may include a function displaying a phase offset value corresponding to the distance information between the antenna module 340 and the anchor and the distance change information between the antenna module 340 and the camera module 350. For example, the phase offset value may be calculated based on the distance information between the antenna module 340 and the anchor and the distance change information between the antenna module 340 and the camera module 350.

In an embodiment, the communication interface 330 may exchange signals (or data) with the anchor in a designated communication method through the antenna module 340 under the control of the processor 310. In an embodiment, the communication interface 330 may correspond to the communication module 190 or the wireless communication module 192 disclosed in FIG. 1, and the designated communication method may be a UWB communication method.

In an embodiment, the antenna module 340 may correspond to the antenna module 197 disclosed in FIG. 1.

In an embodiment, the camera module 350 may correspond to the camera module 180 disclosed in FIG. 1.

In an embodiment, the display module 360 may be stretched in at least one or more directions. The display module 360 may include a flexible substrate and an image display unit. The flexible substrate may be made of a polydimethylsiloxane (PDMS) material having good elasticity and may expand according to a pulling force. The image display unit may be formed on the flexible substrate and may be expanded along with the expansion of the flexible substrate. The image display unit may display an image.

In an embodiment, the electronic device 300 may further include the sensor module 370.

In an embodiment, the sensor module 370 may detect an intensity and direction of force applied to the display module 360.

In an embodiment, the sensor module 370 may include one or more pressure sensors. The one or more pressure sensors may be disposed in the display module 360. When the sensor module 370 includes one or more pressure sensors, each pressure sensor may detect a change in capacitance or a change in resistance between both ends of an area to which pressure (force) is applied. The pressure sensor may transfer one or more of a capacitance change signal representing a change in detected capacitance or a resistance change signal representing a change in resistance to the processor 310. The capacitance change signal or the resistance change signal may include information on one or more of an intensity and a direction of force applied to the pressure sensor.

The processor 310 may obtain at least one of a direction and an intensity of force applied to the display module 360 by using the capacitance change signal or resistance change signal received from the pressure sensor.

In another embodiment, the sensor module 370 may include a plurality of acceleration sensors. When the display module 360 has a rectangular shape, each acceleration sensor may be disposed adjacent to each vertex of the rectangle. When the display module 360 includes a flexible substrate and an image display unit, the plurality of acceleration sensors may be disposed at the bottom of the flexible substrate and the image display unit may be disposed at the top of the flexible substrate, but this is only an example, and the plurality of acceleration sensors may be accommodated in the image display unit.

In an embodiment, the acceleration sensor is a sensor that detects an intensity of acceleration or impact when an object moves. When the acceleration sensor is used, a movement state of the display module 360 may be detected in detail. The acceleration sensor may sense the acceleration of the display module 360 in directions of three axes (x-axis, y-axis, and z-axis) that are perpendicular to each other. The processor 310 may obtain a movement speed using the acceleration in the directions of the three axes measured by the acceleration sensor. The processor 310 may obtain an expanded distance of the display module 360 in the directions of the three axes by using the obtained movement speed. The processor 310 may obtain the direction and intensity of the force applied to the display module 360 using the movement speed and moving distance obtained using the acceleration sensor. The processor 310 may expand the display module 360 according to the direction and intensity of the obtained force. Furthermore, by using the acceleration sensor, a direction the electronic device 300 is facing and a degree of inclination of the electronic device 300 may be measured.

In another embodiment, the sensor module 370 may include a plurality of hall sensors. The plurality of hall sensors may be disposed inside the display module 360 or on the display module 360. When the sensor module 370 includes a plurality of hall sensors, the processor 310 may measure a degree of expansion or contraction of the display module 360 through voltage sensed by the hall sensor according to the force applied to the display module 360.

Figure 4B:
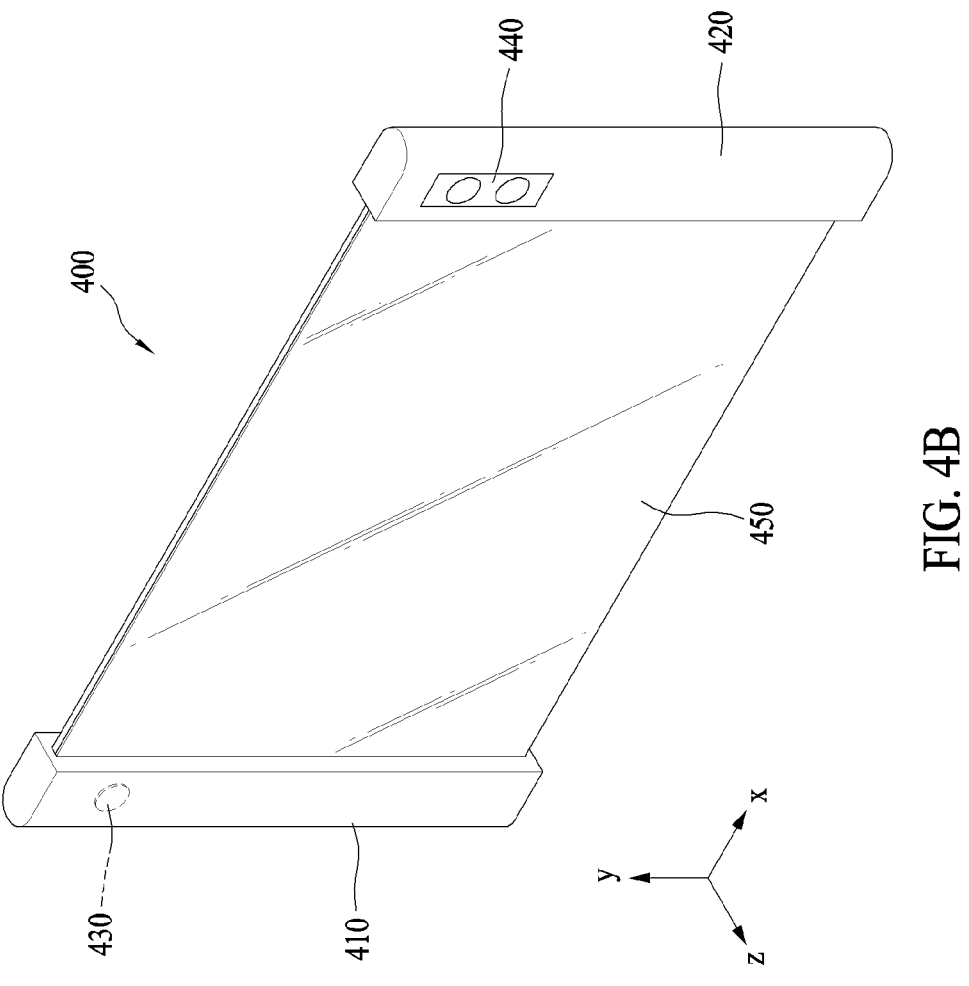
FIGS. 4A and 4B are diagrams illustrating a configuration of a rollable display device that is an example of an electronic device, according to one or more embodiments.
Figure 4A:
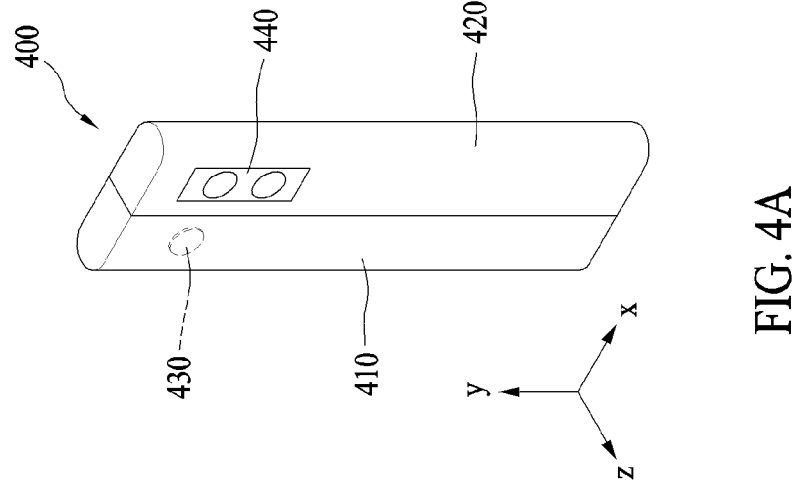

FIGS. 4A and 4B are diagrams illustrating a configuration of a rollable display device that is an example of an electronic device (e.g., the electronic device 300 of FIG. 3), according to one or more embodiments. For clarity of description, a repeated description related to content described above may be simplified or omitted.

FIG. 4A is a rear perspective view of the rollable display device in a first state (e.g., a closed state) in which a display module or display 450 is accommodated in a body portion, and FIG. 4B is a rear perspective view of the rollable display device in a second state (e.g., an open state). The display module 450 according to an embodiment may correspond to the display module 360 disclosed in FIG. 3.

Referring to FIG. 4A, a rollable display device 400 according to an embodiment includes a first housing 410 and a second housing 420. The first housing 410 and the second housing 420 may be spaced apart from each other based on tension applied in a first direction (x-axis). In an embodiment, one surface of the first housing 410 and one surface of the second housing 420 may be disposed to contact each other in a closed state.

As shown in FIG. 4A, in the closed state, the display module 450 may be accommodated inside at least one of the first housing 410 and the second housing 420 and may not be exposed. This is to reduce damage to the display module 450 caused by the external environment.

In an embodiment, the rollable display device 400 may include an antenna module or antenna 430 and a camera module or camera 440. The antenna module 430 and the camera module 440 may respectively correspond to the antenna module 340 and the camera module 350 disclosed in FIG. 3. The antenna module 430 may be disposed in a partial area inside the first housing 410, and the camera module 440 may be disposed in a partial area on a rear surface of the second housing 420. However, these components are not limited to this arrangement. The components may be excluded or disposed on other surfaces, as necessary. For example, the camera module 440 may be provided on a side of the second housing 420 instead of the rear.

Referring to FIG. 4B, one end of the display module 450 may be fixed to the first housing 410, and the other end of the display module 450 may be fixed to the second housing 420. A user may hold the first and second housings 410 and 420 by hand and pull them to expose the display module 450 rolled up and accommodated inside the first and second housings 410 and 420.

The rollable display device 400 according to an embodiment may include a deformation detection means capable of detecting deformation of the display module 450. The deformation detection means may be included in a sensor module (e.g., the sensor module 370 of FIG. 3).

A sensor module or sensor (e.g., the sensor module 370 of FIG. 3) according to an embodiment may be provided in the display module 450 and may detect information related to deformation of the display module 450. Here, the information related to deformation may be a direction, a degree, a position in which the display module 450 is deformed, a time for which the display module 450 is deformed, and/or an acceleration at which the deformed display module 450 is restored. In addition, the information related to deformation may be various types of information that may be detected due to the bending of the display module 450.

In addition, a processor (e.g., the processor 310 of FIG. 3) may calculate an unwinding length of the display module 450 based on the information related to deformation of the display module 450 detected by the deformation detection means.

In an embodiment, as at least one of the first housing 410 and the second housing 420 moves and a size of the display module 450 visually exposed to the outside changes, position information between the antenna module 430 disposed in the first housing 410 and the camera module 440 disposed in the second housing 420 may change. The position information between the antenna module 430 and the camera module 440 may include distance information and phase information between the antenna module 430 and the camera module 440. Hereinafter, position information between "A" and "B" may be understood as including distance information and phase information between "A" and "B", and the distance information and phase information may be a distance and direction between the coordinates of "A" and the coordinates of "B" each existing in a 3D space.

Figure 5B:
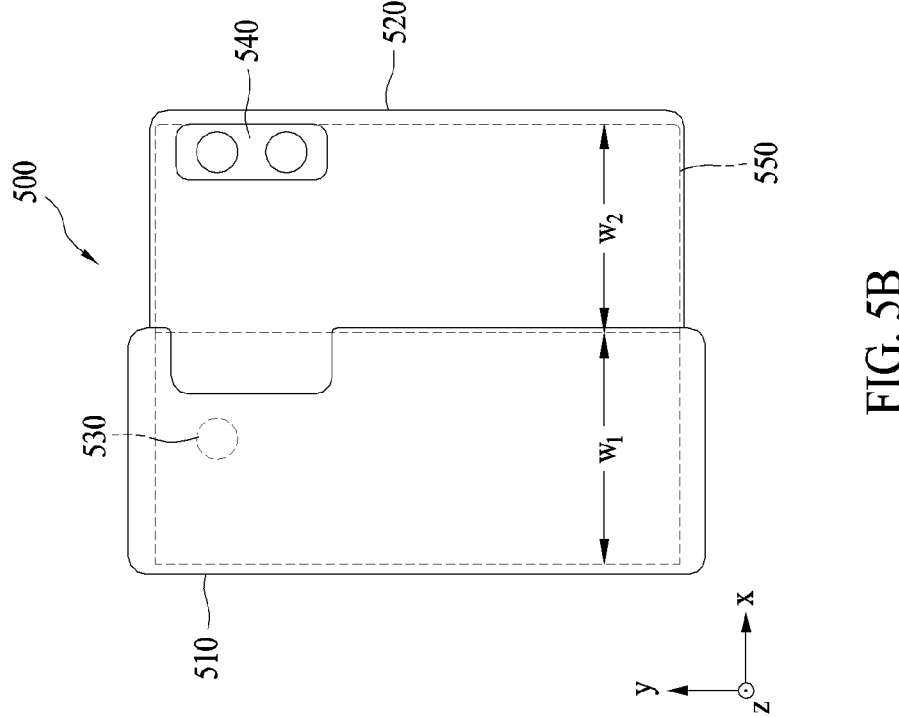
FIGS. 5A and 5B are diagrams illustrating a configuration of a slideable display device that is another example of an electronic device, according to one or more embodiments.
Figure 5A:
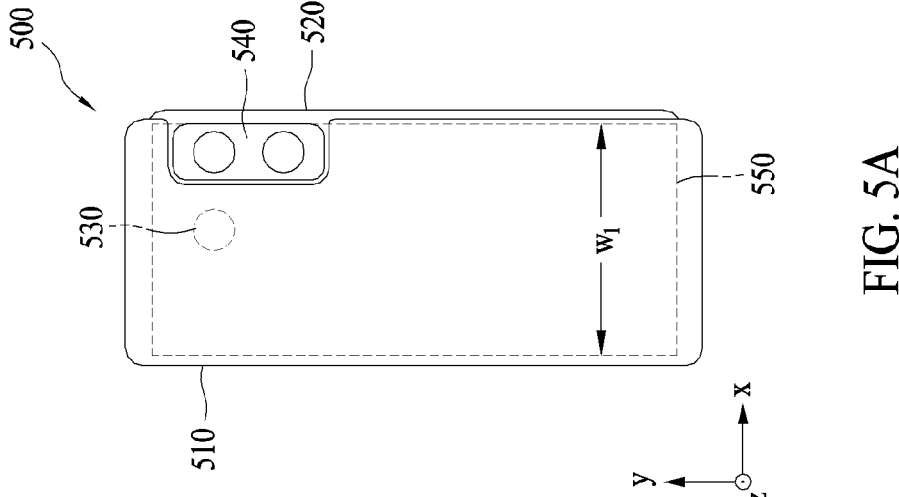

FIGS. 5A and 5B are diagrams illustrating a configuration of a slideable display device 500 that is another example of an electronic device (e.g., the electronic device 300 of FIG. 3), according to one or more embodiments. For clarity of description, a repeated description related to content described above may be simplified or omitted.

Whereas in a closed state of the slideable display device 500 according to an example, a display module or display 550 is accommodated in at least one of first and second housings 510 and 520 and is not exposed, in a closed state of the slideable display device 500 according to another example, a predetermined area of the display module 550 may be exposed without being accommodated in the first and second housings 510 and 520. In this example, a user may verify information related to an event occurring in the electronic device even in the closed state through the predetermined area.

FIG. 5A is a rear perspective view of the slideable display device 500 in a first state (e.g., a closed state) in which the display module 550 is accommodated in a body portion, and FIG. 5B is a rear perspective view of the slideable display device 500 in a second state (e.g., an open state). The display module 550 according to an embodiment may correspond to the display module 360 disclosed in FIG. 3.

Referring to FIG. 5A, the slideable display device 500 according to an embodiment includes the first housing 510 and the second housing 520. The first housing 510 and the second housing 520 may be spaced apart from each other based on tension applied in a first direction (x-axis). In an embodiment, an area corresponding to a first width W1 may be a fixed area where the display module 550 is always visually exposed.

In an embodiment, the slideable display device 500 may include an antenna module or antenna 530 and a camera module or camera 540. The antenna module 530 and the camera module 540 may respectively correspond to the antenna module 340 and the camera module 350 disclosed in FIG. 3. The antenna module 530 may be disposed in a partial area inside the first housing 510, and the camera module 540 may be disposed in a partial area on a rear surface of the second housing 520. However, these components are not limited to this arrangement. The components may be excluded or disposed on other surfaces, as necessary. For example, the camera module 540 may be provided on a side of the second housing 520 instead of the rear.

Referring to FIG. 5B, the first housing 510 may be fixed, and the second housing 520 may be movable relative to the first housing 510 in a sliding manner. For example, the second housing 520 may be formed to be slideable in the first direction (x-axis) of the first housing 510. In an embodiment, the second housing 520 may move in one direction of the first housing 510 by a second width W2. In an embodiment, an area corresponding to the second width W2 may be a variable area in which a size of the variable area is adjusted according to a movement of the second housing 520. As shown in FIG. 5B, when the second housing 510 moves in a +x-axis direction, the variable area may be expanded, and when the second housing 510 moves in a −x-axis direction, the variable area may be contracted.

In an embodiment, the display module 550 may be flexible and a width of a visually exposed area may be adjusted based on the movement of the second housing 520. For example, when the second housing 520 is in an initial state overlapping the first housing 510, at least a portion of the display module 550 may be visually exposed to have the first width W1. As another example, when the second housing 520 moves in a sliding manner and is in an expanded state spaced apart from the first housing 510, another portion of the display module 550 may be further extended by a maximum of the second width W2 and exposed to be visually further expanded.

The slideable display device 500 according to an embodiment may include a deformation detection means capable of detecting deformation of the display module 550. The deformation detection means may be included in a sensor module (e.g., the sensor module 370 of FIG. 3).

The sensor module according to an embodiment may be provided in the display module 550 and may detect information related to deformation of the display module 550. Here, the information related to deformation may be a direction, a degree, a position in which the display module 550 is deformed, a time for which the display module 550 is deformed, and/or an acceleration at which the deformed display module 550 is restored. In addition, the information related to deformation may be various types of information that may be detected due to the bending of the display module 550.

In addition, a processor (e.g., the processor 310 of FIG. 3) may calculate an unwinding length of a screen of the display module 550 based on the information related to deformation of the display module 550 detected by the deformation detection means.

In an embodiment, as at least one of the first housing 510 and the second housing 520 moves and a size of the screen of the display module 550 visually exposed to the outside changes, position information between the antenna module 530 disposed in the first housing 510 and the camera module 540 disposed in the second housing 520 may change.

Figure 6A:
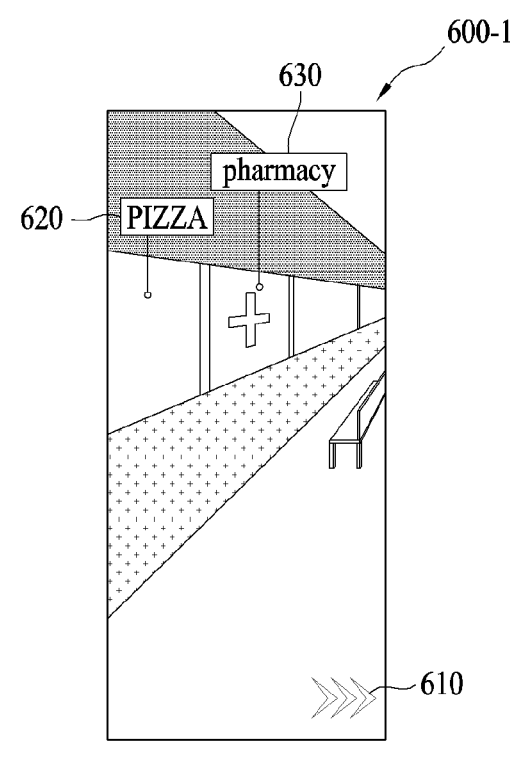
FIGS. 6A to 6B are conceptual views of screens for augmented reality services, according to one or more embodiments.
Figure 6B:
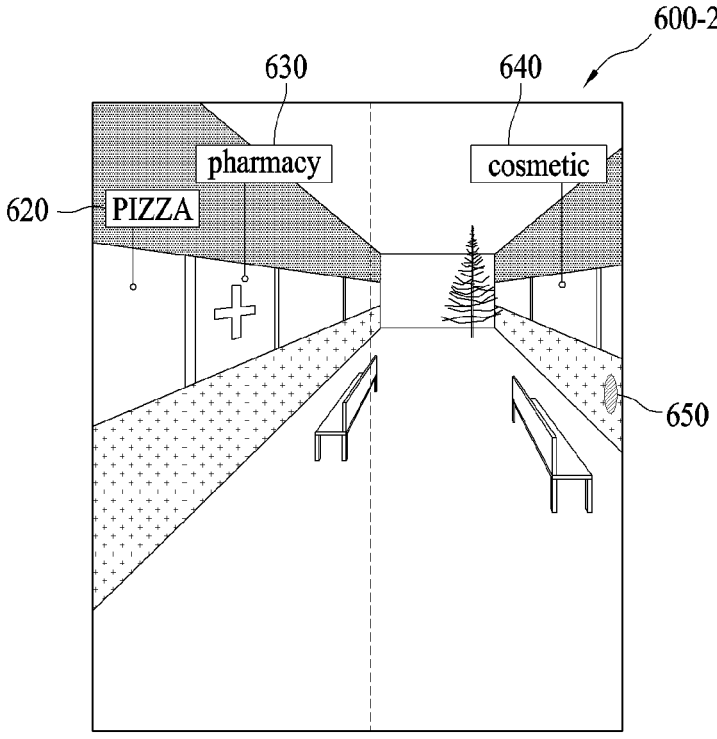

FIGS. 6A to 6B are conceptual views of screens for augmented reality services, according to one or more embodiments. For clarity of description, a repeated description related to content described above may be simplified or omitted.

In an embodiment, in order to provide an augmented reality (AR) service, an electronic device (e.g., the electronic device 300 of FIG. 3) may transmit a captured image and/or position-related information to a server using a communication interface (e.g., the communication interface 330 of FIG. 3). The position-related information may include at least one of real-time position information of an electronic device (e.g., the electronic device 300 of FIG. 3), direction information of the electronic device (e.g., the electronic device 300 of FIG. 3), or tilt information of the electronic device. The real-time position information of an electronic device (e.g., the electronic device 300 of FIG. 3) may be obtained through a global positioning system (GPS) sensor, and the direction information and tilt information of the electronic device (e.g., the electronic device 300 of FIG. 3) may be obtained through an inertial measurement unit (IMU).

In an embodiment, a server may read and transmit various types of additional information to an electronic device (e.g., the electronic device 300 of FIG. 3) using a stored AR service database, and the electronic device (e.g., the electronic device 300 of FIG. 3) may render an image and the additional information together to display a screen for an AR service. Alternatively, the server may render an input image and additional information together and transmit the same to the electronic device (e.g., the electronic device 300 of FIG. 3), and the electronic device (e.g., the electronic device 300 of FIG.) may display a screen for the rendered AR service that is transmitted.

In another embodiment, the electronic device (e.g., the electronic device 300 of FIG. 3) may transmit a captured image and/or position-related information to an anchor rather than a server, and receive an image and additional information input from the anchor. In addition, the electronic device (e.g., the electronic device 300 of FIG. 3) may render the image and additional information together to display a screen for an AR service.

Referring to FIG. 6A, a screen 600-1 for an AR service in a first state (e.g., a closed state) may be an image in a form in which various types of additional information 610, 620 and 630 are displayed together with an image input from a camera module (e.g., the camera module 350 of FIG. 3) of an electronic device (e.g., the electronic device 300 of FIG. 3)(e.g., the electronic device 300 of FIG. 3)(e.g., the electronic device 300 of FIG. 3). The various types of additional information may be direction information 610 for a destination and additional information 620 and 630 for buildings nearby.

In the first state (e.g., the closed state) of the screen 600-1 for the AR service, it may be displayed that there is a road in the center, and the additional information 610 indicating that the destination is on the right side may be displayed together. On the other hand, on the left side of the screen 600-1 for the AR service in the first state (e.g., the closed state), a nearby building called "Pizza" is captured and displayed, and the additional information 620 on the nearby building is displayed together. In addition, on the left side of the screen 600-1 for the AR service in the first state (e.g., the closed state), a nearby building called "Pharmacy" is captured and displayed, and the additional information 630 on the nearby building is displayed together. The additional information 620 and 630 on the nearby buildings may include, for example, name information, contact information, or evaluation information of the nearby buildings.

In an expandable display module (e.g., the display module 360 of FIG. 3) according to an embodiment, since position information of the anchor from a viewpoint of the camera module (e.g., the camera module 350 of FIG. 3) changes in real time as a size of the display screen changes, additional position-related information may be required to provide AR content.

More specifically, in a second state (e.g., an open state), position information of the anchor from a viewpoint of the camera module (e.g., the camera module 350 of FIG. 3) may change in real time as a size of the display screen changes. In order to render AR content at an accurate position, it is necessary to estimate the position information of the anchor in real time from the viewpoint of the camera module (e.g., the camera module 350 of FIG. 3). A detailed method of determining position information of an anchor from a viewpoint of a camera module (e.g., the camera module 350 of FIG. 3) will be described below with reference to FIGS. 8 to 11.

Referring to FIG. 6B, a screen 600-2 for an AR service in the second state (e.g., the open state) may further include additional information 640 and 650 newly displayed as the screen is expanded as well as the additional information 610, 620, and 630 displayed in the first state (e.g., the closed state).

The screen 600-2 for the AR service in the second state (e.g., the open state) may also display the additional information 650 indicating a position of a destination. On the other hand, on the right side of the screen 600-2 for the AR service in the second state (e.g., the open state), a nearby building called "cosmetic" is captured and displayed, and the additional information 640 on the nearby building is displayed together. Similarly, the additional information 640 on the nearby building may include, for example, name information, contact information, or evaluation information of the nearby buildings.

Figure 7:
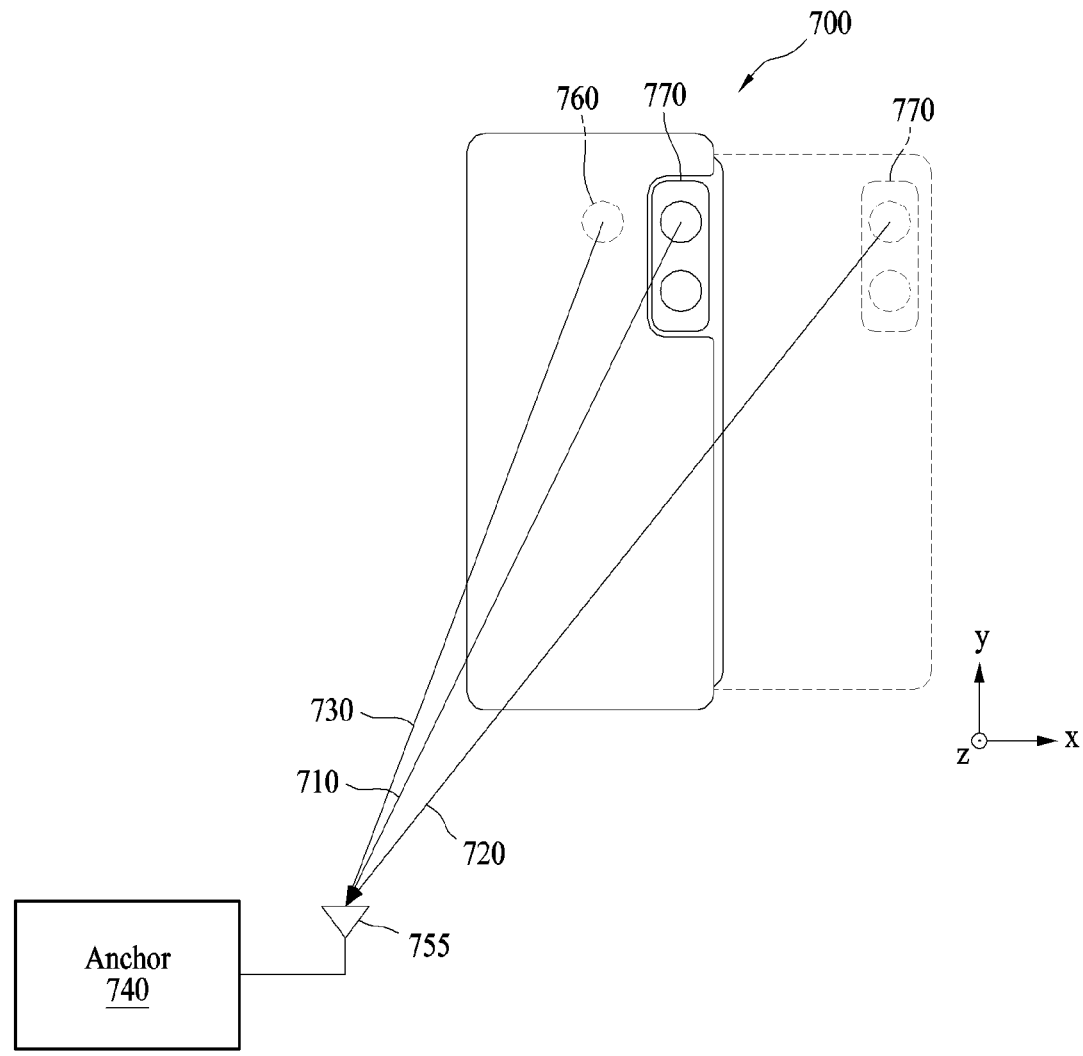
FIG. 7 is a diagram illustrating a method of estimating position information of an anchor from a viewpoint of a camera module, according to one or more embodiments.

FIG. 7 is a diagram illustrating a method of estimating position information of an anchor from a viewpoint of a camera module, according to one or more embodiments. An electronic device 700 according to an embodiment may correspond to the electronic device 300 of FIG. 3, a camera module 770 may correspond to the camera module 350 of FIG. 3, and an antenna module 760 may correspond to the antenna module 340 of FIG. 3. For clarity of description, a repeated description related to content described above may be simplified or omitted.

In order to display AR content on a screen, it is necessary to estimate position information of an anchor 740 (e.g., the external electronic device 102 or 104 of FIG. 1) from a viewpoint of the camera module 770.

In an electronic device in which a size of a display screen does not change, the position information of the anchor from a viewpoint of an antenna may be obtained through communication between an antenna of the electronic device and an antenna of the anchor, and the obtained position information may be used as it is, as the position information of the anchor from the viewpoint of the camera module (e.g., when the camera module and the antenna module are positioned within a predetermined range), or may be corrected to a fixed value and used.

However, in the electronic device 700 according to an embodiment, since a position between the antenna module 760 and the camera module 770 changes as a size of the display screen changes, coordinate values of a position and posture of the anchor 740 from a viewpoint of the camera module 770 may change. Therefore, when position information 730 of the anchor obtained through communication with the anchor 740 is used as it is or corrected to a fixed value and rendered, the AR content may be displayed at an incorrect position. To prevent this, the electronic device 700 according to an embodiment may estimate position information 710 and 720 of the anchor 740 from a viewpoint of the camera module 770 in real time.

In an embodiment, the position information 710 and 720 of the anchor 740 from a viewpoint of the camera module 770 may be determined using the position information 730 of the anchor 740 from a viewpoint of the antenna module 760. The antenna module 760 of the electronic device 700 may collect position information data through communication (e.g., UWB communication) in a designated format with an antenna module 755 mounted on the anchor 740. A processor (e.g., the processor 310 of FIG. 3) of the electronic device 700 may calculate distance information and phase information between the antenna module 760 and the anchor 740 based on the collected position information data.

For example, the processor (e.g., the processor 310 of FIG. 3) of the electronic device 700 may calculate a distance between the antenna module 760 and the anchor 740 by calculating a time of flight (ToF) between the antenna module 760 and the anchor 740, based on the position information data obtained through UWB communication with the antenna module 755 mounted on the anchor 740. In addition, the antenna module 760 of the electronic device 700 may include a UWB antenna module, and the processor (e.g., the processor 310 of FIG. 3) may calculate an angle of arrival (AoA) between the antenna module 760 and the anchor 740, based on a phase difference between signals received from a plurality of patch antenna modules included in the UWB antenna module 760 to the antenna module 755 mounted on the anchor 740.

In an embodiment, the electronic device 700 may estimate the position information 710 and 720 between the camera module 770 and the anchor 740 using the position information 730 of the anchor 740 from a viewpoint of the antenna module 760. For example, in the first state (e.g., the closed state), the electronic device 700 may estimate the position information 710 between the camera module 770 and the anchor 740 using the position information 730 of the anchor 740 from a viewpoint of the antenna module 760. In addition, in the second state (e.g., the open state), the electronic device 700 may estimate the position information 720 between the camera module 770 and the anchor 740 using the position information 730 of the anchor 740 from a viewpoint of the antenna module 760. A detailed method of estimating the position information 720 between the camera module 770 and the anchor 740 using the position information 730 of the anchor 740 from a viewpoint of the antenna module 760 will be described below with reference to FIGS. 8 to 11. In addition, the position information of the anchor 740 from a viewpoint of the antenna module 760 may be referred to as first position information between the antenna module 760 and the anchor 740, and the position information of the anchor 740 from a viewpoint of the camera module 770 may be referred to as second position information between the camera module 770 and the anchor 740.

Figure 8:
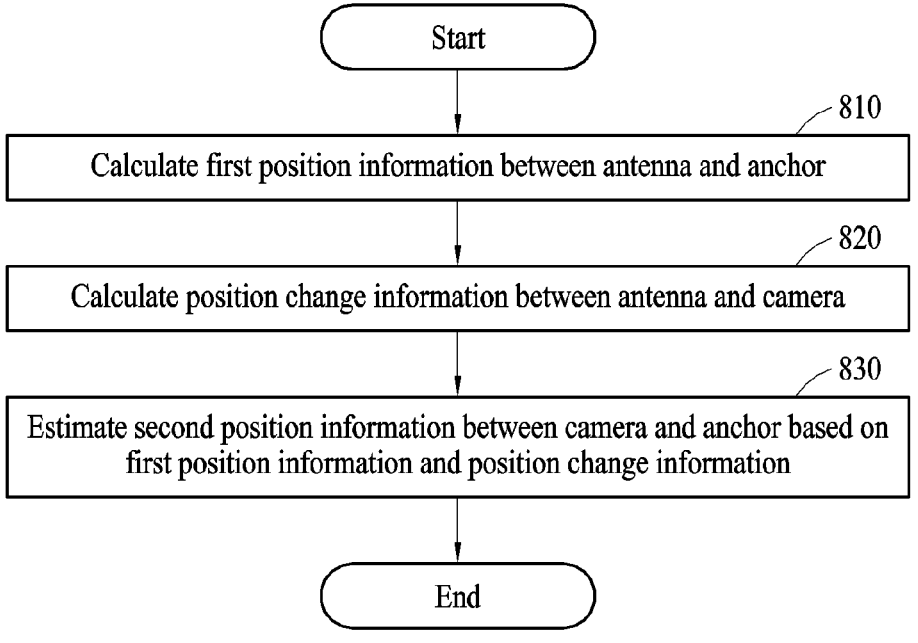
FIGS. 8, 9A, and 9B are flowcharts illustrating a method of estimating second position information, according to one or more embodiments.
Figure 9A:
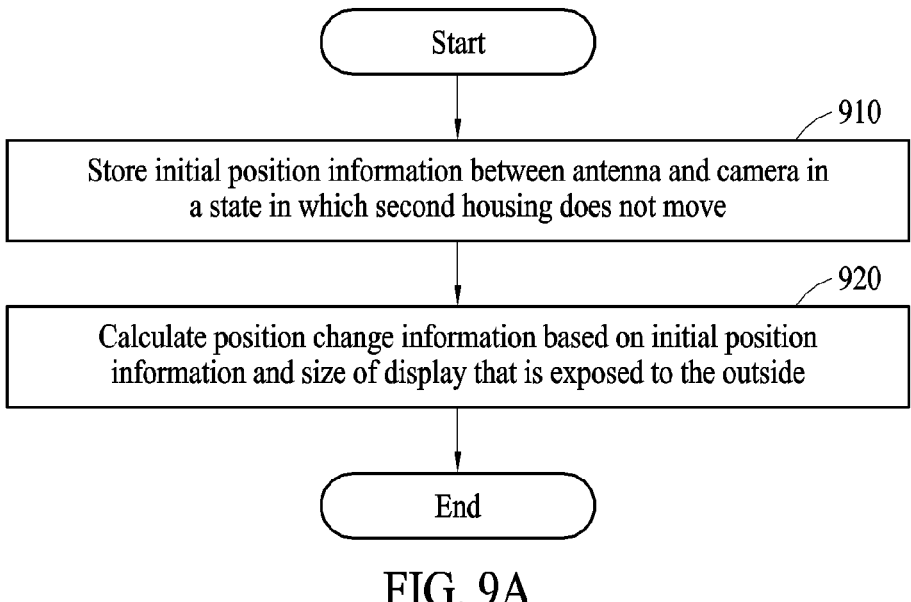
Figure 9B:
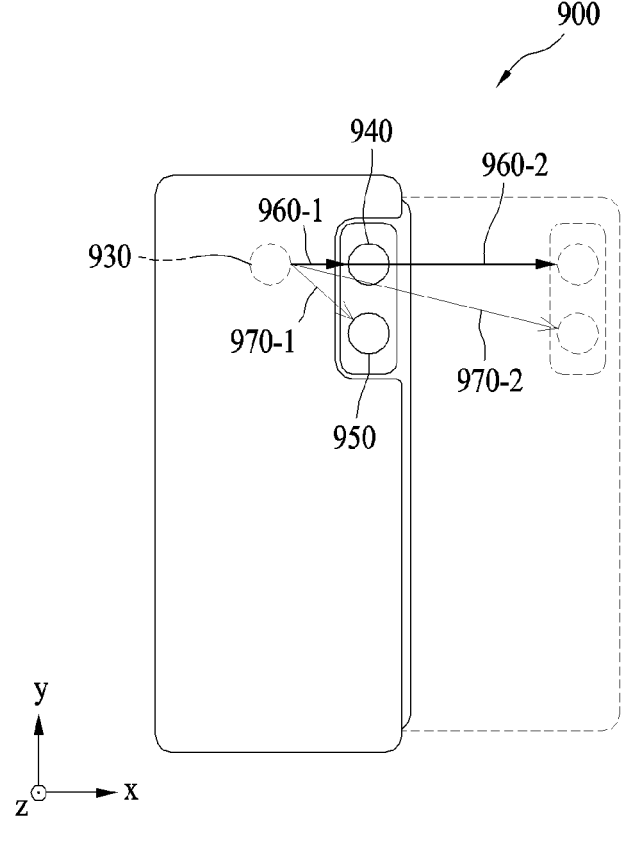

FIGS. 8 to 9B are flowcharts illustrating a method of estimating second position information, according to one or more embodiments.

Referring to FIG. 8, operations 810 to 830 according to an embodiment may be performed by the electronic device (e.g., the electronic device 300 of FIG. 3) described above with reference to FIGS. 1 to 7. Operations of FIG. 8 may be performed in the shown order and manner. However, the order of some operations may change, or some of the operations may be omitted, without departing from the spirit and scope of the shown example. The operations shown in FIG. 8 may be performed in parallel or simultaneously.

In operation 810, an electronic device (e.g., the electronic device 300 of FIG. 3) may calculate first position information (e.g., the position information 730 of the anchor from a viewpoint of the antenna module of FIG. 7) between an antenna module and an anchor.

In operation 820, the electronic device (e.g., the electronic device 300 of FIG. 3) may calculate position change information between the antenna module and a camera. A detailed method of calculating the position change information between the antenna module and the camera will be described below with reference to FIGS. 9A and 9B.

Referring to FIG. 9A, operations 910 and 920 according to an embodiment may be performed by the electronic device (e.g., the electronic device 300 of FIG. 3) described above with reference to FIGS. 1 to 7. Operations of FIG. 9A may be performed in the shown order and manner. However, the order of some operations may change, or some of the operations may be omitted, without departing from the spirit and scope of the shown example. The operations shown in FIG. 9A may be performed in parallel or simultaneously.

In operation 910, a memory (e.g., the memory 320 of FIG. 3) of an electronic device 900 may store initial position information 960-1 and/or 970-1 between an antenna module 930 and a camera module in a state in which a second housing (e.g., the second housing 520 of FIGS. 5A, B) does not move.

In operation 920, a processor (e.g., the processor 310 of FIG. 3) of the electronic device 900 may calculate position change information 960-2 and 970-2 based on the initial position information 960-1 and/or 970-1 and a size of a screen of a display module (e.g., the display module 360 of FIG. 3) that is visually exposed to the outside.

Referring to FIG. 9B, the camera module may include a plurality of cameras 940 and 950. The first camera 940 may be positioned along the same line as the antenna module 930 in a first direction (x-axis), and the second camera 950 may be positioned along the same line as the first camera 940 in a second direction (y-axis).

In an embodiment, the display module (e.g., the display module 360 of FIG. 3) may include a sensor module, and the sensor module may detect information related to deformation of the display module (e.g., the display module 360 of FIG. 3). Here, the information related to deformation may be a direction, a degree, a position in which the display module (e.g., the display module 360 of FIG. 3) is deformed, a time for which the display module 450 is deformed, an acceleration at which the deformed display module 450 is restored, and the like. In addition, the information related to deformation may be various types of information that may be detected due to the bending of the display module 450.

In an embodiment, the processor (e.g., the processor 310 of FIG. 3) of the electronic device 900 may calculate the position change information 960-2 between the antenna module 930 and the first camera 940 based on the initial position information 960-1 and a size of the screen visually exposed to the outside. More specifically, distance information between the antenna module 930 and the first camera 940 may be calculated by combining the initial position information 960-1 stored in the memory and the position change information of the first camera 940. Since the antenna module 930 and the first camera 940 are positioned along the same line in the first direction (x-axis), phase information between the antenna module 930 and the first camera 940 in the first direction (x-axis) may not change and only the distance information may change. For example, the position change information 960-2 between the antenna module 930 and the first camera 940 may include the distance information between the antenna module 930 and the first camera 940.

In an embodiment, the processor (e.g., the processor 310 of FIG. 3) of the electronic device 900 may calculate the position change information 970-2 between the antenna module 930 and the second camera 950 based on the initial position information 970-1 and a size of the screen visually exposed to the outside. More specifically, the distance information between the antenna module 930 and the second camera 950 may be calculated by combining the initial position information 970-1 stored in the memory and the position change information of the second camera 950. Based on the first direction (x-axis), the phase information as well as the distance information between the antenna module 930 and the second camera 950 may change.

Referring back to FIG. 8, in operation 830, the electronic device (e.g., the electronic device 300 of FIG. 3) may estimate second position information between the camera module and the anchor based on the first position information and the position change information. A detailed method of estimating the second position information will be described below with reference to FIGS. 10A and 10B.

Figure 10A:
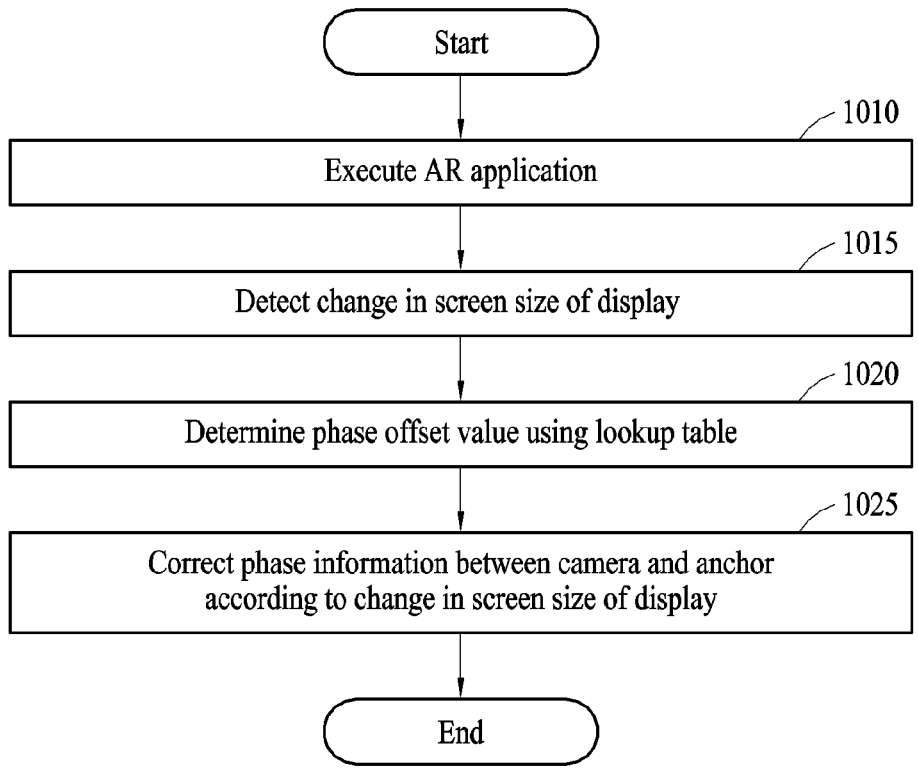
FIG. 10A is a diagram illustrating a method of estimating second position information through phase offset value compensation, according to one or more embodiments.

FIG. 10A is a diagram illustrating a method of estimating second position information through phase offset value compensation, according to one or more embodiments.

Referring to FIG. 10A, operations 1010 to 1025 according to an embodiment may be performed by an electronic device (e.g., the electronic device 300 of FIG. 3) described above with reference to FIGS. 1 to 9A. Operations of FIG. 10A may be performed in the shown order and manner. However, the order of some operations may change, or some of the operations may be omitted, without departing from the spirit and scope of the shown example. The operations shown in FIG. 10A may be performed in parallel or simultaneously.

In operation 1010, an electronic device (e.g., the electronic device 300 of FIG. 3) may execute an AR application (e.g., the application 146 of FIG. 2).

In operation 1015, the electronic device (e.g., the electronic device 300 of FIG. 3) may detect a change in a screen size of a display module.

In operation 1020, the electronic device (e.g., the electronic device 300 of FIG. 3) may determine a phase offset value using a lookup table. A memory (e.g., the memory 320 of FIG. 3) according to an embodiment may store a plurality of lookup tables displaying phase offset values corresponding to distance information between an antenna module (e.g., the antenna module 340 of FIG. 3) and an anchor and distance change information between the antenna module (e.g., the antenna module 340 of FIG. 3) and a camera module (e.g., the camera module 350 of FIG. 3).

In an embodiment, the lookup tables may be provided according to first position information (e.g., position information of an anchor from a viewpoint of an antenna module), and each lookup table may indicate phase offset values corresponding to distance change information. For example, Table 1 below shows an example of a lookup table when a distance between the antenna module and the anchor is 1 m and an AoA is θ.

TABLE 1

| Distance change information (x) | Phase offset value |
|---|---|
| 0 cm < x < 5 cm | 0° |
| 5 cm ≤ x < 10 cm | 3° |
| 10 cm ≤ x < 15 cm | 6° |
| 15 cm ≤ x < 20 cm | 9° |
| 20 cm ≤ x < 25 cm | 12° |

In an embodiment, a processor (e.g., the processor 310 of FIG. 3) may determine a target lookup table corresponding to the first position information from among the plurality of lookup tables, and determine a phase offset value from the target lookup table based on the position change information. For example, when the distance between the antenna module and the anchor is 1 m the AoA is θ, and the distance change information is 10 cm, the processor (e.g., the processor 310 of FIG. 3) may determine the lookup table of Table 1 to be the target lookup table, and determine the phase offset value to be 6°.

In operation 1025, the electronic device (e.g., the electronic device 300 of FIG. 3) may correct phase information between the camera module and the anchor according to a change in a screen size. In the above-described example, the processor (e.g., the processor 310 of FIG. 3) may estimate the phase information between the camera module and the anchor by compensating the phase offset value by 6° for the phase information between the antenna module and the anchor.

Figure 10B:
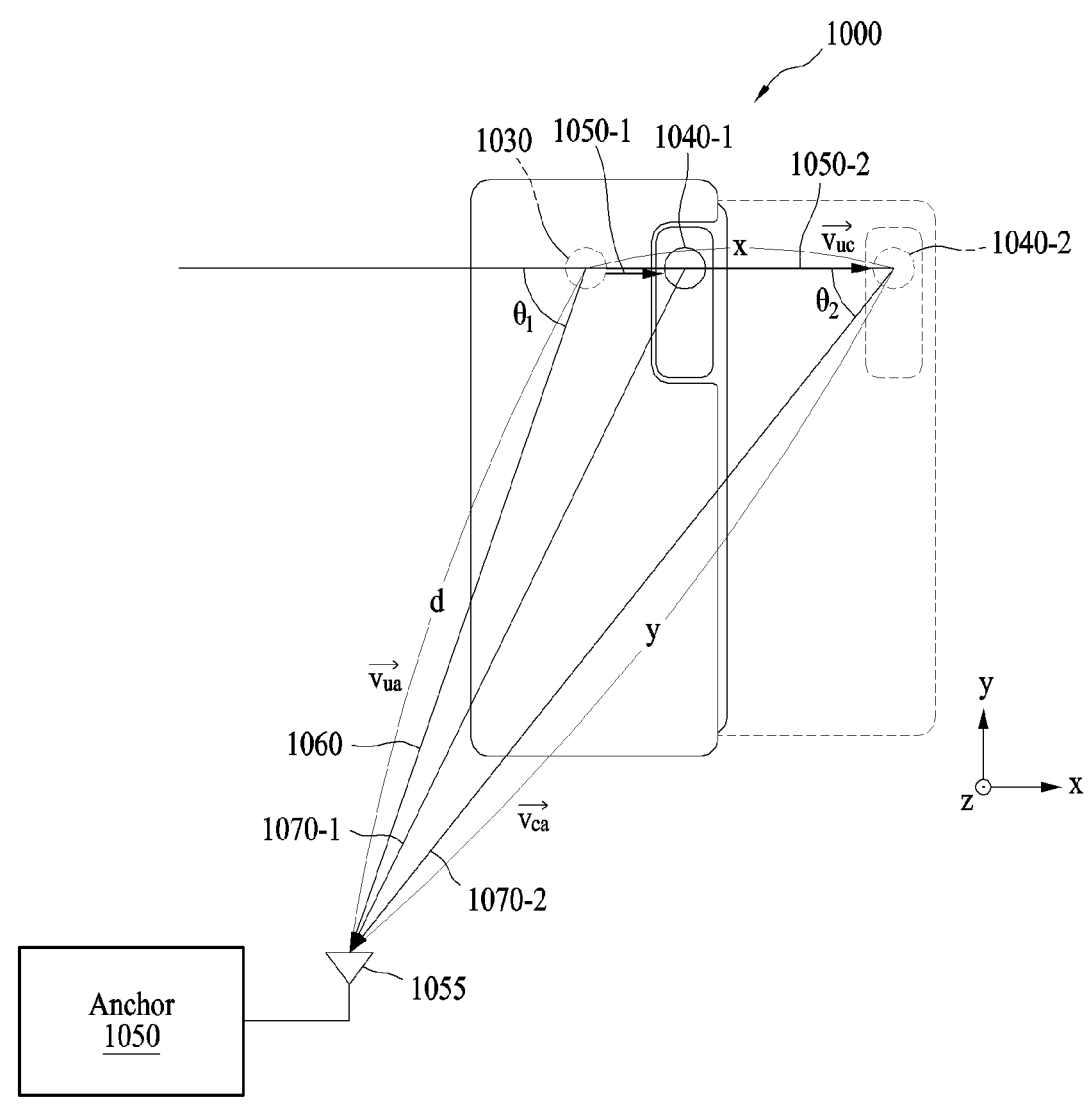
FIG. 10B is a diagram illustrating a method of estimating second position information through vector calculation, according to one or more embodiments.

FIG. 10B is a diagram illustrating a method of estimating second position information through vector calculation, according to one or more embodiments.

Referring to FIG. 10B, an electronic device 1000 according to an embodiment may estimate position information 1070 between a camera module 1040 and an anchor based on position information 1060 between an antenna module 1030 and an anchor 1050 and distance information 1050-3 between the antenna module 1030 and a camera module 1040.

In an embodiment, position information between A and B may be expressed in a vector form ($d\angle\theta1$) using distance information (d) and phase information (θ) between A and B. For example, the position information 1060 $\vec{v}_{ua}$ between the antenna module 1030 and the anchor 1050 may be expressed as $d\angle\theta1$, and position information $\vec{v}_{uc}$ between the antenna module 1030 and the camera module 1040 may be expressed as $x\angle0=x$. In this example, the position information 1070 between the camera module 1040 and the anchor may be expressed as $\vec{v}_{ca}=\vec{v}_{ua}-\vec{v}_{uc}=y\angle\theta2$.

The electronic device 1000 according to an embodiment may calculate the position information 1060 $\vec{v}_{ua}=d\angle\theta1$ between the antenna module 1030 and the anchor 1050 using the method described with reference to FIG. 7.

The electronic device 1000 according to an embodiment may calculate the position information $\vec{v}_{uc}=x\angle0=x$ between the antenna module 1030 and the camera module 1040 using the method described with reference to FIGS. 9A and 9B. In FIG. 10B, for ease of description, the phase information between the antenna module 1030 and the camera module 1040 is described based on 0°, but the phase information between the antenna module 1030 and the camera module 1040 is not limited to the example described above and may have an arbitrary value.

The electronic device 1000 according to an embodiment may calculate both $\vec{v}_{ua}$ and $\vec{v}_{uc}$, so the position information 1070 $\vec{v}_{ca}$ between the camera module 1040 and the anchor may be calculated by the calculation of $\vec{v}_{ua}-\vec{v}_{uc}$, and distance information (y) and phase information (θ2) between the camera module 1040 and the anchor may be obtained from the calculation result $y\angle\theta2$.

Figure 11:
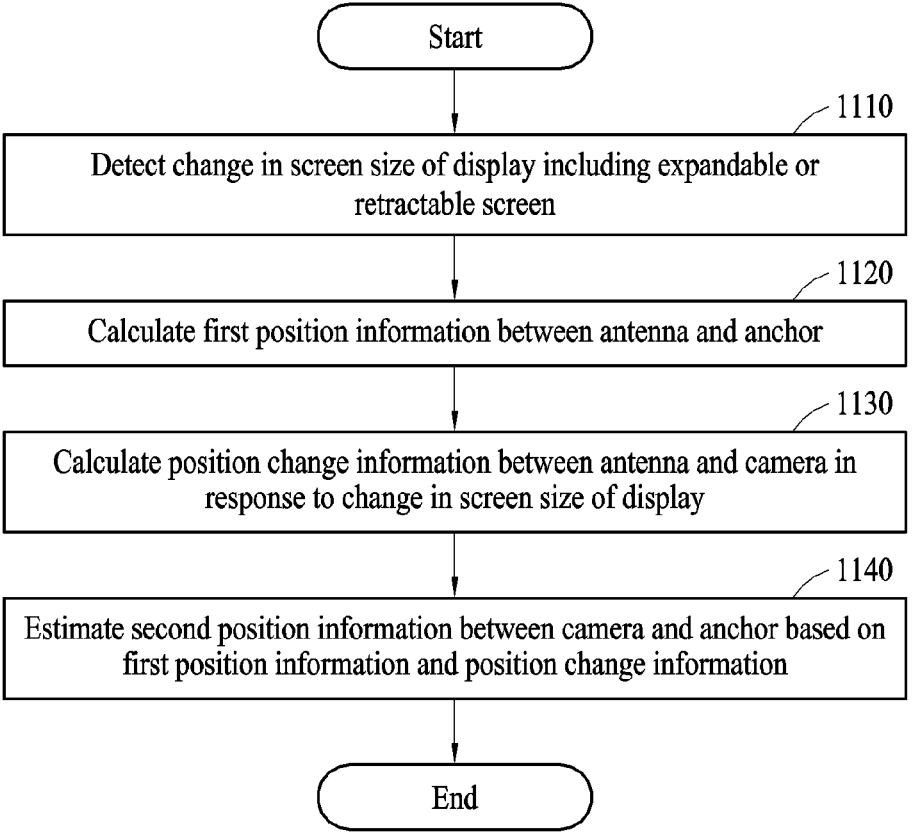
FIG. 11 is a flowchart illustrating a method of providing augmented reality content, according to one or more embodiments.

FIG. 11 is a flowchart illustrating a method of providing AR content, according to one or more embodiments.

Referring to FIG. 11, operations 1110 to 1140 according to an embodiment may be performed by an electronic device (e.g., the electronic device 300 of FIG. 3) described above with reference to FIGS. 1 to 10B. Operations of FIG. 11 may be performed in the shown order and manner. However, the order of some operations may change, or some of the operations may be omitted, without departing from the spirit and scope of the shown example. The operations shown in FIG. 11 may be performed in parallel or simultaneously.

In operation 1110, an electronic device (e.g., the electronic device 300 of FIG. 3) detects a change in a screen size of a display module including an expandable or retractable screen.

In operation 1120, the electronic device (e.g., the electronic device 300 of FIG. 3) calculates first position information between an antenna module and an anchor.

In operation 1130, the electronic device (e.g., the electronic device 300 of FIG. 3) calculates position change information between the antenna module and a camera module in response to the change in the screen size.

In operation 1140, the electronic device (e.g., the electronic device 300 of FIG. 3) estimates second position information between the camera and the anchor based on the first position information and position change information.

In operation 1150, the electronic device (e.g., the electronic device 300 of FIG. 3) obtains direction information and tilt information of the electronic device.

In operation 1160, the electronic device (e.g., the electronic device 300 of FIG. 3) receives additional information determined based on the second position information, the direction information, and the tilt information of the electronic device.

In operation 1170, the electronic device (e.g., the electronic device 300 of FIG. 3) renders AR content based on the additional information.

According to an embodiment, a method according to various embodiments disclosed herein may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components may be omitted, or one or more other components may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a first housing;
a second housing, wherein at least one of the first housing and the second housing is configured to be movable relative to the other one of the first housing and the second housing;
a display comprising a screen which is expandable or retractable, wherein a size of a part of the screen visually exposed to an outside changes as at least one of the first housing and the second housing is moved;
an antenna disposed in a partial area of the first housing;
a camera disposed in a partial area of the second housing;
a memory storing instructions; and
at least one processor configured to execute the instructions to:
obtain information on a first position between the antenna and an anchor;
obtain information on a change between a position of the antenna and a position of the camera; and
estimate information on a second position between the camera and the anchor based on the information on the first position and the information on the change between the position of the antenna and the position of the camera.

2. The electronic device of claim 1, wherein the memory comprises:
a plurality of lookup tables storing phase offset values corresponding to distance information between the antenna and the anchor, and information on a distance change between the antenna and the camera, and
wherein the at least one processor is further configured to execute the instructions to:
determine a phase offset value from the plurality of lookup tables based on the information on the first position and the information on the change between the position of the antenna and the position of the camera.

3. The electronic device of claim 2, wherein the at least one processor is further configured to execute the instructions to:
determine a target lookup table corresponding to the information on the first position from among the plurality of lookup tables; and
determine the phase offset value from the target lookup table based on the information on the change between the position of the antenna and the position of the camera.

4. The electronic device of claim 1, further comprising:
a sensor configured to detect the size of the part of the screen visually exposed to the outside.

5. The electronic device of claim 4, wherein the memory is configured to:

store information on an initial position between the antenna and the camera in a state in which the second housing does not move, and
wherein the at least one processor is further configured to execute the instructions to:
obtain the information on the change between the position of the antenna and the position of the camera based on the information on the initial position and the size of the part of the screen visually exposed to the outside.

6. The electronic device of claim 5, wherein the at least one processor is further configured to execute the instructions to:
obtain the information on a distance change between the antenna and the camera based on the information on the initial position and the size of the part of the screen visually exposed to the outside.

7. The electronic device of claim 5, wherein the at least one processor is further configured to execute the instructions to:
obtain information on a phase change between the antenna and the camera based on the information on the initial position and the size of the part of the screen visually exposed to the outside.

8. The electronic device of claim 1, wherein the antenna is configured to:
collect position information data for obtaining the information on the first position by communicating with an antenna mounted on the anchor, and
wherein the at least one processor is further configured to execute the instructions to:
obtain distance information and phase information between the antenna and the anchor based on the position information data.

9. The electronic device of claim 8, wherein the antenna comprises:
an ultra-wideband (UWB) antenna, and
wherein the at least one processor is further configured to execute the instructions to:
obtain the phase information between the antenna and the anchor based on a phase difference of a signal received from a plurality of patch antennas comprised in the UWB antenna to the antenna mounted on the anchor.

10. The electronic device of claim 9, wherein the at least one processor is further configured to execute the instructions to:
obtain direction information between the camera and the anchor based on the distance information and the phase information between the antenna and the anchor, and distance information between the antenna and the camera.

11. The electronic device of claim 10, wherein the at least one processor is further configured to execute the instructions to:
obtain distance information between the camera and the anchor based on the distance information and the phase information between the antenna and the anchor, and the distance information between the antenna and the camera.

12. The electronic device of claim 1, further comprising:
an inertial measurement unit (IMU) sensor for measuring direction information on a direction the electronic device is facing and tilt information of the electronic device,
wherein the at least one processor is further configured to execute the instructions to:
receive additional information determined based on the information on the second position, the direction information, and the tilt information, and render augmented reality content based on the additional information.

13. A method of providing augmented reality content by an electronic device comprising a display comprising a screen that is expandable or retractable, the method comprising:

detecting a change in a size of the screen that is visually exposed to an outside;

obtaining information on a first position between an antenna of the electronic device and an anchor;

obtaining information on a change between a position of the antenna and a position of a camera of the electronic device;

estimating information on a second position between the camera and the anchor based on the information on the first position and the information on the change between the position of the antenna and the position of the camera;

obtaining direction information and tilt information of the electronic device;

receiving additional information determined based on the information on the second position and the direction information and the tilt information of the electronic device; and rendering the augmented reality content based on the additional information, wherein the position of the camera changes as the size of the screen changes.

14. The method of claim 13, wherein the estimating of the information on the second position comprises:

determining a phase offset value from a plurality of lookup tables based on the information on the first position and the information on the change between the position of the antenna and the position of the camera; and estimating the information on the second position by compensating the phase offset value for the information on the first position, and wherein the plurality of lookup tables stores phase offset values corresponding to distance information between the antenna and the anchor and information on a distance change between the antenna and the camera.

15. The method of claim 14, wherein the determining of the phase offset value comprises:

determining a target lookup table corresponding to the information on the first position from among the plurality of lookup tables; and determining the phase offset value from the target lookup table based on the information on the change between the position of the antenna and the position of the camera, and wherein the estimating of the information on the second position comprises:

obtaining at least one of direction information and distance information between the camera and the anchor, based on the distance information and phase information between the antenna and the anchor, and distance information between the antenna and the camera.

* * * * *